United States Patent
Stringer et al.

[11] Patent Number: 5,987,125
[45] Date of Patent: Nov. 16, 1999

[54] METHOD FOR COMMUNICATING SEISMIC DATA

[75] Inventors: J. Haynie Stringer, Sugar Land; Gary Lynn Fair, Houston, both of Tex.

[73] Assignee: Western Atlas International, Inc., Houston, Tex.

[21] Appl. No.: 08/990,505

[22] Filed: Dec. 15, 1997

[51] Int. Cl.⁶ ........................................ H04L 9/00
[52] U.S. Cl. .................................. 380/4; 380/21
[58] Field of Search ...................... 380/4, 21, 3; 367/68; 707/1, 9; 713/201, 200

[56] References Cited

U.S. PATENT DOCUMENTS

| | | |
|---|---|---|
| 4,663,743 | 5/1987 | Rampuria et al. . |
| 5,010,571 | 4/1991 | Katznelson .................................. 380/4 |
| 5,247,575 | 9/1993 | Sprague et al. .............................. 380/9 |
| 5,559,888 | 9/1996 | Jain et al. .................................. 380/25 |
| 5,592,549 | 1/1997 | Nagel et al. .................................. 380/4 |
| 5,652,717 | 7/1997 | Miller et al. ............................. 364/578 |

*Primary Examiner*—Tod R. Swann
*Assistant Examiner*—Trevor Quick Coddington
*Attorney, Agent, or Firm*—J. Albert Riddle; Gerald E. Lester

[57] ABSTRACT

Seismic survey data is stored in encrypted format in a first memory. The first memory module is transferred to a first computer in a first location. A portion of the seismic survey data is selected using a second computer in the first location, wherein the second computer communicates with a second location. A request authorization is transmitted from the second computer to the second location. A decryption code is transmitted from the second location to the second computer. The decryption code is transferred from the second computer to the first computer. The decryption code is applied to the selected portion of seismic survey data in the first computer, making available seismic survey data in decrypted format.

17 Claims, 2 Drawing Sheets

METHOD FOR COMMUNICATING SEISMIC DATA

BACKGROUND OF THE INVENTION

1. Field of the Invention

The present invention relates generally to seismic surveys and, more particularly, to a method for communicating seismic survey data for geophysical prospect evaluation.

2. Description of the Related Art

Geophysical prospect evaluation is the process of analyzing the processed data from seismic surveys to evaluate the possible presence of hydrocarbons or other valuable mineral deposits in a prospect area. Seismic surveying is a process of analyzing underground earth formations in the prospect area for structural information that would indicate the possible presence of the mineral deposits. In seismic surveying, a seismic source is used to send acoustic waves toward the earth formations. Typically used seismic sources are vibrators on land and airguns in the water. The acoustic waves that reflect from the interfaces between the earth formations are detected with seismic receivers. Typically used seismic receivers are geophones laid out in arrays on land and hydrophones towed in streamers in the water. In addition, both geophones and hydrophones may be paired in dual sensor ocean bottom cable receivers laid on the water bottom. The number of source and receiver locations used can be quite large in any case. The time and amplitude information of the detected acoustic waves are recorded for data processing. The processed information can be used for evaluating the underground structure and possible mineral content of the prospect area.

A problem in geophysical prospect evaluation is the difficulty of gaining timely access to the seismic data. Because of the large number of source and receiver locations used to record data, seismic data sets are quite large compared to the transmission capacity of current communication means. The large size of seismic data sets slows down their transmission from those who acquire the data to those who need to evaluate the data. Today's geophysical communication environment encounters logistical issues of transmission circuit availability and size; cost for full time, dedicated, point-to-point lines with burst usage periods totaling 5% or less of the total available monthly bandwidth; long lead times to install higher bandwidth communication facilities; and the administrative and physical implementation issues associated with security at both the originating and receiving ends of the data transfer process. Additionally, the bandwidth required to transmit large seismic data volumes at optimum speeds is not practically available at reasonable costs. All these problems prevent the immediate access to speculative seismic survey data by those who wish to evaluate seismic prospects.

SUMMARY OF THE INVENTION

Seismic survey data is stored in encrypted format in a memory. The memory is transferred to a first computer in a first location. A portion of the seismic survey data is selected using a second computer in the first location, wherein the second computer communicates with a second location. A request authorization is transmitted from the second computer to the second location. A decryption code is transmitted from the second location to the second computer. The decryption code is transferred from the second computer to the first computer. The decryption code is applied to the selected portion of seismic survey data in the first computer, making available seismic survey data in decrypted format.

BRIEF DESCRIPTION OF THE DRAWINGS

A better understanding of the benefits and advantages of the present invention may be obtained from the appended detailed description and drawing figures, wherein.

DESCRIPTION OF THE PREFERRED EMBODIMENTS

A single standalone workstation with a large volume hard disk is installed at a potential evaluator's facility. The hard disk contains seismic survey data in encrypted format. A buffer hard disk is attached to evaluator's computer network containing processing workstations via Network File Service (NFS). A standalone personal computer at the evaluator's site is connected via modem to a geographic information inventory system at the data provider's office capable of displaying all available survey data, data previously acquired by evaluator, and data available on the hard disk in map format. The evaluator reviews data using the geographic information system user interface, selects data to be accessed and drops an authorization code and an order in a maildrop on a PC. The decryption code is placed in the evaluator's return maildrop on the PC. The decryption code is then carried to the standalone workstation via a computer diskette. The requested data are read from the encrypted hard disk, decrypted and written onto the NFS hard disk. There the decrypted seismic data are immediately available to the processing applications running on the evaluator's computer network.

Figure 1:
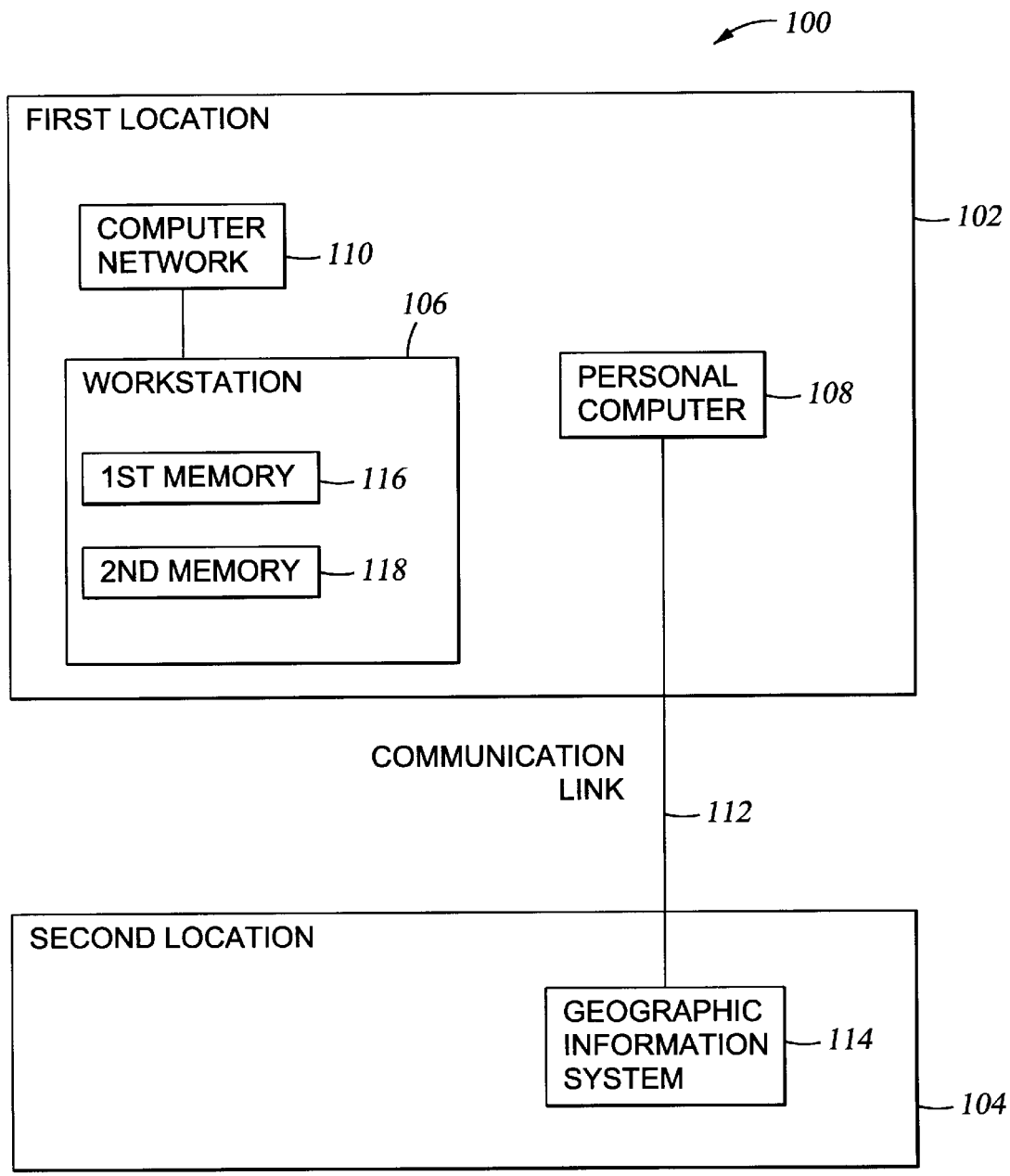
FIG. 1 is a schematic diagram showing the preferred apparatus of the present invention for communicating seismic survey data between locations.

FIG. 1 is a schematic diagram showing the preferred apparatus for practicing the present invention for efficiently communicating seismic survey data to a first location from a second location. The apparatus is generally designated as 100. The present invention communicates seismic survey data to a first location 102, preferably the facility of a data evaluator, from a second location 104, preferably the facility of a data provider. Two computers 106 and 108 are installed at the first location 102. The first computer 106 is preferably a compact workstation with at least two memory modules. The second computer 108 is preferably a personal computer. The first computer 106 is preferably connected to the rest of the computer network 110 at the first location 102. The second computer 108 is preferably disconnected from the rest of the computer network 110 at the first location 102, but is connected by a communication link 112 to a Geographic Information System (GIS) interface 114 at the second location 104. The communication link 112 could be a dedicated phone line, normal phone lines connected by modems, or the Internet.

The first memory module 116 in the first computer 106 is preferably a disk subsystem that is portable. The first memory module 116 contains portions of seismic survey data in encrypted format. Preferably, seismic survey data is loaded at the second location 104 into the first memory module 116. Then the first memory module 116 is transported to the first location 102 and connected to the first computer 106, swapping out the previous first memory module 116. Alternatively, the first memory module 116 in the first computer 106 is connected to the second location 104 by an alternative communication link (not shown) and the encrypted seismic survey data is transferred to the first memory module 116 in the first computer 106 over the alternative communication link at whatever transmission speed is available. The alternative communication link could be a dedicated phone line, normal phone lines connected by modems, a satellite link, or the Internet. In either case, once the seismic survey data is loaded in the first memory module 116 in the first computer 106, the seismic data is immediately vailable for access in the computer network 110 at the first location 102 over normal in-house data transmission links at currently available network speeds.

A security decryption code is provided as portions of the seismic survey data are selected, in order to allow access to the encrypted data. With the security code, the selected portion of seismic data can be accessed in the first memory module 116 in the first computer 106, decrypted, and then written to a second memory module 118 in the first computer 106, preferably in common SEGY format. Alternatively, the decrypted seismic data subset could be output in Landmark format or any other desired format. This second memory module 118 and its decrypted seismic data are available on the client computer network 110 at the first location 102 through standard Network File Service (NFS) operations. The preferred access disk used for the first memory module 116 holds approximately 100 blocks of Western Geophysical post stack Ultra Survey data or 190 blocks of other survey data in any combination. Additional access disks may be added on demand to the memory module 116 to increase the total amount of data available for immediate access through the method of the present invention.

Viewing and selection of the available seismic data are addressed through use of the second computer 108 located at the first location 102 and connected to the Geographic Information System interface 114 at the second location 104 by the communication link 112. This Geographical Information System interface 114 will display in map and report format all seismic survey data available. Survey data already acquired by the client will preferably be color coded for display as will the survey data which are currently available in encrypted format on the access disk in the first memory module 116. Authorized personnel at the first location 102 may select survey data by mouse and polygon digitization or by lease block. An appropriate request authorization for the selected survey data is sent via the communication link 112 to the Geographic Information System (GIS) interface 114 at the second location 104. An appropriate data decryption code will be sent from the second location 104 to access by personnel at the first location 102. The decryption code will be either emailed to the desired evaluator's address or placed on a mailbox on the Geographic Information System interface 114 for the evaluator to retrieve. The evaluator would then pick up the decryption code, transfer it via hard media, such as computer diskette, to the first computer 106, and then use the decryption code to decrypt and transfer the data to the open, non-encrypted disk in the second memory module 118. There the decrypted survey data would be accessible by any authorized personnel on the computer network 110 at the first location 102.

Figure 2:
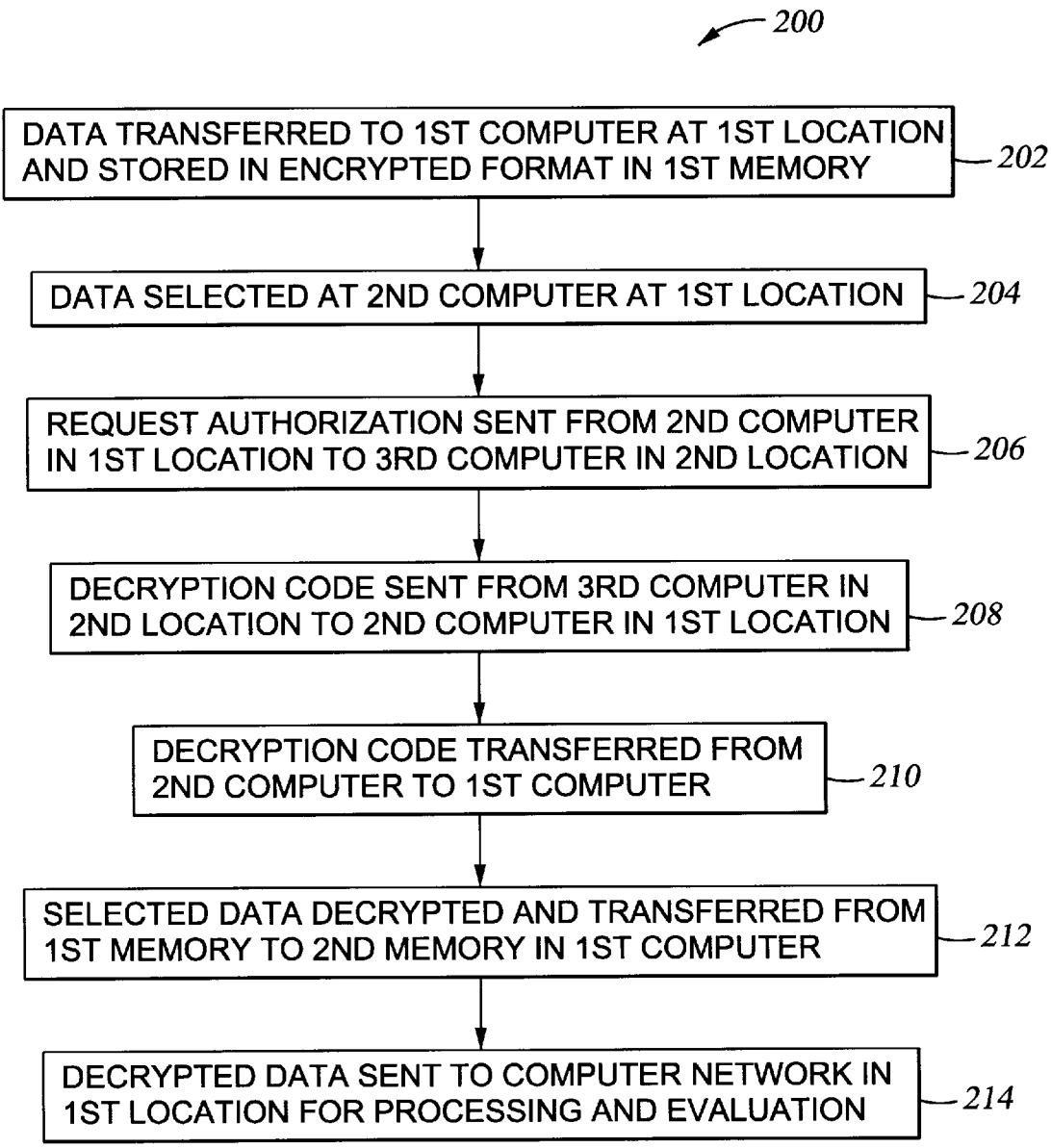
FIG. 2 is a flow chart showing the preferred method of the present invention for communicating seismic survey data between locations.

FIG. 2 is a flow chart showing the preferred method of the present invention for efficiently communicating seismic survey data to a first location from a second location. The method is generally designated as 200. Seismic survey data is transferred to a first computer in the first location and stored in encrypted format in a first memory module in the first computer, as shown in block 202. Preferably, the seismic survey data is stored into the first memory module at the second location and then the first memory module is physically transferred to a first computer in the first location.

Alternatively, the encrypted seismic survey data may be transmitted to the first memory module over a communication link such as a dedicated phone line, normal phone lines, satellite link or the Internet. A portion of the seismic survey data from block 202 is selected using a second computer in the first location, as shown in block 204. Preferably, the second computer communicates via a communications link with a third computer at the second location. Preferably the third computer at the second location is a Geographical Information System interface. Preferably all communications to the second location go through a security firewall. A request authorization for the portion of seismic survey data selected in block 204 is transmitted from the second computer in the first location to the third computer in the second location, via the communication link, as shown in block 206. A decryption code for the portion of seismic survey data selected in block 204 is transmitted from the third computer in the second location to the second computer in the first location in response to the request authorization from block 206, as shown in block 208. The decryption code from block 208 is transferred from the second computer to the first computer in the first location, as shown in block 210. The selected portion of seismic survey data from block 204 is decrypted and transferred from the first memory module in the first computer to a second memory module in the first computer, using the decryption code from block 210, as shown in block 212. The selected portion of seismic survey data from block 204, is now available in the second memory module in decrypted format. Preferably the first computer in the first location is connected via a communication link to a computer network at the first location. The decrypted portion of seismic survey data from block 212 is sent to the computer network at the first location for processing and evaluation, as shown in block 214.

The present invention is a tool to shorten the prospect evaluation cycle. The method and apparatus described above addresses all network and data security issues that arise as well at the requirement for the most rapid data delivery practical. As stated above, the present invention is expandable at relatively inexpensive increments by just adding additional memory modules. Additional output formats may also be added.

The present invention provides immediate access to previously-unacquired speculative seismic data at client facility while it avoids need for a high bandwidth telecommunication infrastructure. The present invention has simple access, data location and retrieval through a Geographical Information System interface and has data security though data encryption. The present invention allows access to the desired seismic survey data through the client's own applications on the client's own computer network. The buffering concept in the present invention allows data to trickle in through lower bandwidth connection, yet be available at the higher direct connection speeds of the local computer network when the data are actually required. The present invention provides the required data receiving protocol functionality even at the higher bandwidths, so that the client does not need to design specialized data receipt software.

The present invention has been described with a certain degree of specificity. Variations will occur to those skilled in the art which are within the scope of the present invention.

What is claimed is:

1. A method for communicating seismic survey data to a first location from a second location, comprising the steps of:

transferring seismic survey data in encrypted format to a memory in a first computer in the first location from the second location;

selecting seismic survey data at a second computer in the first location via a communication link with the second location;

transmitting a request authorization from the second computer to the second location and receiving a decryption code at the second computer from the second location in response to the request authorization;

physically transferring the decryption code from the second computer to the first computer; and applying the decryption code to the selected seismic survey data, to make available seismic survey data in decrypted format.

2. The method of claim 1, wherein the first computer is a workstation and the second computer is a personal computer.

3. The method of claim 1, wherein the memory is a portable computer disk subsystem.

4. The method of claim 1, wherein the communication link is the Internet.

5. The method of claim 1, wherein the communication link is a phone line.

6. The method of claim 1, wherein the step of transferring the decryption code further comprises the step of:

physically transferring the decryption code via a computer diskette.

7. The method of claim 1, further comprising the steps of:

transferring the decrypted seismic survey data from the first computer to a computer network in the first location via a second communication link;

processing the decrypted seismic survey data in the computer network; and evaluating the processed seismic survey data in the computer network.

8. A method for communicating seismic survey data to a first location from a second location, comprising the steps of:

transferring the seismic survey data in encrypted format to a first memory in a first computer in the first location from the second location;

selecting the seismic survey data at a second computer in the first location via a communication link with a third computer in the second location;

transmitting a request authorization from the second computer to the third computer and receiving a decryption code at the second computer from the third computer in response to the request authorization;

physically transferring the decryption code from the second computer to the first computer; and applying the decryption code to the selected seismic survey data and transferring the selected seismic survey data from the first memory to a second memory in the first computer, making available seismic survey data in decrypted format.

9. The method of claim 8, wherein the first computer is a workstation, the second computer is a personal computer, and the third computer is a geographic information system interface.

10. An apparatus for communicating seismic survey data to a first location from a second location, comprising:

a first computer in the first location, including a memory containing the seismic survey data in encrypted format;

a second computer in the first location, connected via a communication link to the second location and including means for selecting seismic survey data from the second location, means for transmitting a request authorization to the second location, and means for receiving a decryption code from the second location in response to the request authorization;

means for physically transferring the decryption code from the second computer to the first computer; and the first computer further comprising means for applying the decryption code to the selected seismic survey data, to make available seismic survey data in decrypted format.

11. The apparatus of claim 10, wherein the first computer is a workstation and the second computer is a personal computer.

12. The apparatus of claim 10, wherein the communication link is the Internet.

13. The apparatus of claim 10, wherein the memory is a portable computer disk subsystem.

14. The apparatus of claim 10, wherein the means for physically transferring the decryption code is a computer diskette.

15. The apparatus of claim 10, further comprising:

a computer network in the first location, connected via a second communication link to the first computer;

means in the computer network for processing the decrypted seismic survey data; and means in the computer network for evaluating the processed seismic survey data.

16. An apparatus for communicating seismic survey data to a first location from a second location, comprising:

a first computer in the first location, including a first memory containing the seismic survey data in encrypted format and a second memory;

a second computer in the first location, connected via a communication link to a third computer in the second location and including means for selecting seismic survey data from the third computer, means for transmitting a request authorization to the third computer, and means for receiving a decryption code from the third computer in response to the request authorization;

means for physically transferring the decryption code from the second computer to the first computer; and the first computer further comprising means for applying the decryption code to the selected seismic survey data and transferring the selected seismic survey data from the first memory to the second memory, to make available seismic survey data in decrypted format.

17. The apparatus of claim 16, wherein the first computer is a workstation, the second computer is a personal computer, and the third computer is a geographic information system interface.

* * * * *